Oct. 4, 1960   C. A. RICH, JR   2,955,002
BEARING
Filed Dec. 26, 1957
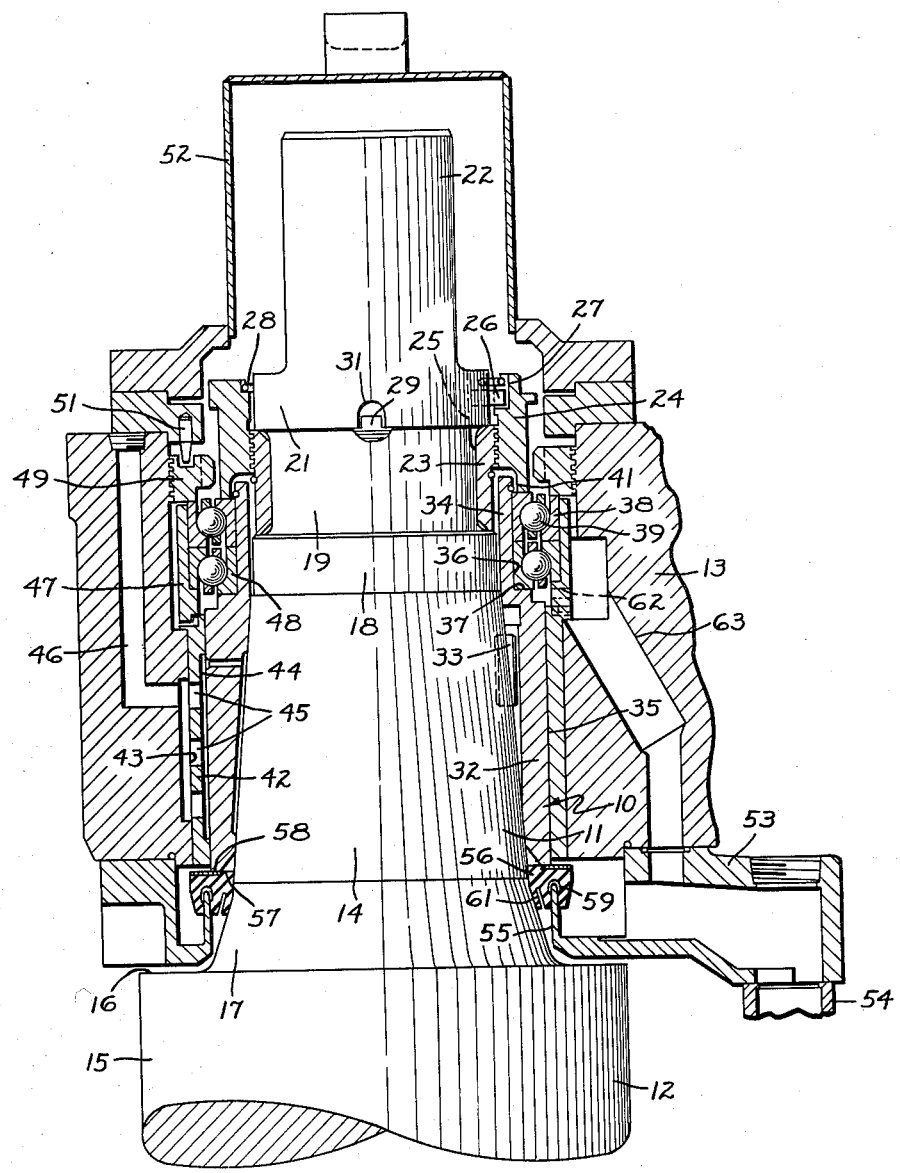
INVENTOR.
Charles A. Rich Jr.
BY Norman S. Blodgett
Attorney United States Patent Office 2,955,002
Patented Oct. 4, 1960

2,955,002

BEARING

Charles A. Rich, Jr., Worcester, Mass., assignor to Morgan Construction Company, Worcester, Mass., a corporation of Massachusetts Filed Dec. 26, 1957, Ser. No. 705,216

6 Claims. (Cl. 308—36.2)

This invention relates to a bearing and more particularly to the construction and arrangement of a bearing for use with the roll neck of a vertical rolling mill.

In the rolling of ferrous metals it is desirable on occasion to provide a rolling mill stand in which the rolls are mounted with their axes vertical. It has been recognized for some time that it would be desirable to provide such rolls with oil-film bearings of the type shown and described in the patent of Dahlstrom, No. 2,018,055. However, attempts to apply such bearings to the roll necks of vertical rolls have not been altogether successful, mainly because of difficulties with retaining lubricant in the bearing and because of certain sealing problems. These and other difficulties experienced with the prior art devices have been obviated in a novel manner by the use of the present invention.

It is, therefore, an outstanding object of the present invention to provide an oil-film bearing for use on the roll necks of rolls of a vertical rolling mill.

It is another object of this invention to provide an oil-film bearing for use with the uppermost roll neck of a roll of a vertical rolling mill wherein loss of lubricant is reduced to a minimum.

A still further object of the present invention is the provision of an oil-film bearing for the upper roll necks of a vertical rolling mill which is simple and inexpensive to manufacture, is capable of a long life of useful service, and in which maintenance and removal of the bearing is greatly simplified.

With these and other objects in view, as will be apparent to those skilled in the art, the invention resides in the combination of parts set forth in the specification and covered by the claims appended hereto.

The character of the invention may be best understood by reference to one of its structural forms, as illustrated by the accompanying drawing in which the single figure is a vertical, sectional view of a vertical rolling mill bearing embodying the principles of the present invention.

Referring to the drawing it can be seen that the bearing, designated generally by the reference numeral 10, is mounted on the roll neck 11 of the roll 12 of a vertical rolling mill. The bearing 10 is mounted in and surrounded by a chock 13 which is mounted in the usual way in the frame of a vertical rolling mill, not shown. As is evident in the drawing, the roll neck 11 is the one which is uppermost in the rolling mill and is provided with a substantial tapered portion 14. The roll 12 is provided with an enlarged cylindrical portion 15 in the usual manner, the cylindrical portion terminating in a radial shoulder 16 which is joined to the tapered portion 14 by a transition portion 17. At its upper end the tapered portion 14 merges into a short cylindrical portion 18, at the upper end of which the roll neck is formed with a cylindrical portion 19 of considerably reduced diameter. Above the cylindrical portion 19 the roll neck is formed with a short cylindrical portion 21 of somewhat larger diameter. Above the cylindrical portion 21, the roll neck is formed with the usual reduced portion 22. In the annular groove formed by the cylindrical portion 19 and the shoulders of the cylindrical portions 18 and 21 resides a threaded member 23 which is formed in two halves to permit it to be placed in the groove. The outer surface of the threaded member 23 is formed with a coarse thread and on this thread is mounted a nut 24. The roll neck in the vicinity of the cylindrical portion 21 is provided with an axial keyway 25 in which resides a key 26; the key also cooperates with a mating keyway 27 formed in the inner portion of the nut 24. A suitable snap ring 28 prevents the key from being removed from its keyways during normal operation. It should be noted that the threaded member 23 is provided with a tongue 29 which engages a short keyway 31 formed in the surface of the roll neck in the cylindrical portion 21 thereof.

A sleeve 32 is provided with a tapered internal bore adapted to fit snugly over the tapered portion 14 of the roll neck, and a roller-type key 33 is provided to prevent rotation of the sleeve 32 relative to the roll neck. The sleeve is provided with a tubular extension 34 which extends concentrically of the cylindrical portion 18 and of the inner part of the cylindrical portion 19. The sleeve 32 is also provided with a cylindrical surface 36 of a considerably reduced diameter with a shoulder 37 extending between the two cylindrical surfaces. The inner race 48 of a roller bearing 39 is mounted on the tubular portion 34 in contact with the cylindrical surface 36 thereof, and is retained in place against the shoulder 37. The bearing 39 is one of the type designed for thrust loads. The lower end of the nut 24 is pressed against the upper end of the inner race 48 of the bearing 39 to retain it in place and the lower end of the nut 24 is provided with a tubular flange extension 41 for this purpose.

Overlying and surrounding the cylindrical surface 35 of the sleeve 32, is a bushing 42 which resides in a bore 43 formed in the chock 13. The inner bore of the bushing 42 is formed with an oil pocket 44 joined by ports 45 to oil-admitting passages 46 formed in the chock. A retaining ring 47 lies within the chock over the upper end of the bushing 42 and has the outer race 38 of the bearing 39 mounted therein. The retaining ring 47 and the outer race of the bearing are held in place by the engagement of a nut 49 with the upper end of the outer race 38 which outer race is held against a shoulder on the inner side of the retaining ring 47. The nut 49 is threadedly engaged with the chock 13 and a tapered pin 51 locks the nut against rotation during normal operation. A protective housing 52 is mounted on the chock and overlies the entire roll neck and protects it from dust and dirt. On the lower side of the chock 13 is mounted a collector housing 53 which extends around the transition portion 17. The housing 53 is hollow and is connected by a conduit 54 to the sump, not shown, of the bearing lubricating system. The housing 53 is firmly attached to the lower side of the chock 13 and is provided with suitable sealing means to prevent the exit of oil between the two. A tubular flange 55 extends upwardly from the housing in general alignment with the outer cylindrical surface 35 of the sleeve 32; this flange is concentric with the roll and is embraced by a seal 56, the upper side of which engages the lower end of the sleeve 32. The seal also engages the surface of the roll neck in the area between the transition portion 17 and the tapered portion 14. The seal 56 is made of rubber or similar material and has an upper flat surface 57 provided with a hardened metal insert 58 to reduce wear. Extending upwardly into the seal is an annular slot 59 which, when the seal is not in use, is of a generally teardrop, cross-sectional shape, having little width at the bottom but considerable width at the top. In use, however, the slot 59 resides over the flange 55 and is retained in a somewhat open position. Beside the slot 59 a secondary slot 61 extends upwardly into the seal in a manner somewhat inclined upwardly and inwardly of the axis of the roll neck. This gives the inner portion of the annular seal a somewhat resilient quality for its contact with the transition portion 17.

A suitable passage 62 extends through the retaining ring 47 and a passage 63 extends through the chock from the vicinity of the passage 62 to the housing 53.

The operation of the apparatus of the invention may now be readily understood in view of the above discussion. During the operation of a rolling mill, the chock 15 remains fixed in the roll stand while the roll 12 is driven by means of a spindle attached to the lower end. The sleeve 32 revolves with the roll 12 and the roll neck 11, while the bushing 42 remains with the chock. Oil enters the bearing through the passage 46 in the chock and the ports 45 opening into the recess 44. The rotation of the sleeve 32 relative to the bushing 42 causes the build-up of a hydrodynamic oil film which keeps the two bearing surfaces separated and absorbs the roll separating forces. The axial forces on the roll, which are mainly those brought about by the weight of the roll itself, are absorbed in the ball bearing 39. Oil leaving the space between the sleeve 32 and the bushing 42 at the upper end pass through the passage 63 into the housing 53 and are carried through the conduit 54 to the oil sump of the lubrication system. Oil leaving the bearing surfaces at the lower end flow over the top of the seal 56 into the housing and the conduit 54 also. Any tendency of oil to leave the bearing by way of the top of the seal 56 and the end of the sleeve 32 is counteracted by the pressure of the sleeve 32 on the plate 58 mounted in the seal. This pressure is brought about principally by means of the nut 24. If oil does manage to get by the surfaces it must also pass between the seal 56 and the surface of the roll neck, principally the transition portion 17. The pressure of the seal against the surface prevents this loss of oil. Loss of oil around the flange 55 is prevented by the grasping action of the seal and the surfaces of the slot 59 which embrace the flange. The seal 56, the flange 55, and the sleeve 32, therefore, combine to prevent loss of oil from the bearing adjacent the shoulder 16 of the roll.

It is obvious that minor changes may be made in the form and construction of the invention, without departing from the material spirit thereof. It is not, however, desired to confine the invention to the exact form herein shown and described, but it is desired to include all such as properly comes within the scope claimed.

The invention having been thus described, what is claimed as new and desired to be secured by Letters Patent is:

1. A roll neck bearing for an upper rolling neck of a vertical rolling mill, wherein the roll neck is tapered and terminates in a radial shoulder, comprising a sleeve having a tapered bore for mounting on the roll neck, an outer cylindrical surface, and an end adjacent the shoulder of the roll neck, a bushing loosely surrounding the sleeve, a chock in which the bushing is mounted, the chock having connected thereto a cylindrical, tubular flange, extending axially of the roll from the vicinity of the shoulder toward the sleeve, the flange being generally aligned with the outer surface of the sleeve, and a seal having a pair of annular lips embracing the said flange, the seal also slidably engaging the said end of the sleeve.

2. A roll neck bearing for an upper roll neck of a vertical rolling mill, wherein the roll neck terminates at its lower end in a radial shoulder, comprising a sleeve fixed on the roll neck with one end residing a short distance from the shoulder of the roll neck, a bushing loosely surrounding the sleeve, a chock in which the bushing is fixed, means for introducing lubricating fluid between the sleeve and bushing for the maintenance during operation of a hydrodynamic film, the chock having a tubular flange connected thereto extending axially of the roll from the vicinity of the shoulder toward the sleeve, the flange being concentric with the roll, and a seal formed with an annular groove embracing the said flange, the seal also slidably engaging the said one end of the sleeve.

3. A bearing for an upper roll neck of a vertical rolling mill, wherein the roll neck terminates at its lower end in a radial shoulder, comprising a sleeve fixed to the roll neck with its end residing a short distance from the shoulder of the roll neck, a bushing surrounding the sleeve, a chock in which the bushing is fixed, means for introducing lubricating fluid between the bushing and sleeve for the maintenance during operation of a hydrodynamic film, the chock having a lubricant-collecting housing located adjacent the shoulder, means affording passage for lubricating fluid from the ends of the bushing to the housing, the housing having a tubular flange extending axially of the roll from the vicinity of the shoulder toward the sleeve, the flange being concentric with the roll, and a rubber-like seal formed with an annular groove defining a pair of annular lips embracing the said flange, the seal also slidably engaging the said end of the sleeve and the surface of the roll neck.

4. A bearing for an upper roll neck of a vertical rolling mill, wherein the roll neck terminates at its lower end in a radial shoulder, comprising a sleeve fixed to the roll neck with its end residing a short distance from the end of the roll neck, a bushing surrounding the sleeve, a chock in which the bushing is fixed, means for introducing lubricating fluid between the bushing and sleeve for the maintenance during operation of a hydrodynamic film, the chock having a lubricant-collecting housing located adjacent the shoulder, means affording passage for lubricating fluid from the ends of the bushing to the housing, the housing having a tubular flange extending axially of the roll from the vicinity of the shoulder toward the sleeve, the flange being concentric with the roll, and a rubber-like seal engaging the said end of the sleeve and the surface of the roll neck, the seal having an annular groove of tear-drop cross-sectional shape formed in the lower portion thereof which embraces the upper edge of the said flange.

5. A bearing for an upper roll neck of a vertical rolling mill, wherein the roll neck is tapered and terminates at its lower end in a radial shoulder, comprising a sleeve having a tapered bore mounted on the roll neck, means for pressing the sleeve axially to lock it on the roll neck, the sleeve having one end residing a short distance from the shoulder of the roll neck, a bushing surrounding the sleeve, a chock in which the bushing is fixed, means for introducing lubricating fluid for the maintenance during operation of a hydrodynamic film, the chock having a lubricant-collecting housing located adjacent the shoulder, means affording passage for lubricating fluid from the ends of the bushing toward the housing, the housing having a tubular flange extending axially of the roll from the vicinity of the roll toward the sleeve, the flange being concentric with the roll, and a seal formed of rubber-like material engaging the said end of the sleeve and the surface of the roll neck, the seal having an annular groove of tear-drop, cross-sectional shape formed in the lower portion thereof, the edges of which embrace the upper surfaces of the said flange, a hardened metal insert bonded into the upper part of the seal for engagement with the said end of the sleeve.

6. A bearing for an upper roll neck of a vertical rolling mill, wherein the roll neck terminates at its lower end in a radial shoulder, comprising a sleeve fixed to the roll neck with its end residing a short distance from the end of the roll neck, a bushing surrounding the sleeve, a chock in which the bushing is fixed, means for introducing lubricating fluids between the bushing and the sleeve for the maintenance during operation of a hydrodynamic film, the chock having a lubricant-collecting housing located adjacent the shoulder, means affording passage for lubricating fluid from the ends of the bushing to the housing, the housing having a tubular flange extending axially of the roll from the vicinity of the shoulder toward the sleeve, the flange being concentric with the roll, and a rubber-like seal engaging the said end of the sleeve and the surface of the roll neck, the seal having an annular groove formed in the lower portion thereof defining a pair of annular lips which embrace the upper edge of the said flange.

References Cited in the file of this patent

UNITED STATES PATENTS

| | | |
|---|---|---|
| 2,018,055 | Dahlstrom | Oct. 22, 1935 |
| 2,243,009 | Kingsbury et al. | May 20, 1941 |
| 2,243,961 | Howorth | June 3, 1941 |
| 2,773,367 | Slaght | Dec. 11, 1956 |
| 2,860,931 | Brooks | Nov. 18, 1958 |

FOREIGN PATENTS

| | | |
|---|---|---|
| 736,228 | Germany | June 10, 1943 |